United States Patent [19]

Holzinger et al.

[11] Patent Number: 5,017,120
[45] Date of Patent: May 21, 1991

[54] TIE-ROD ASSEMBLY FOR AN INJECTION MOLDING PRESS

[75] Inventors: Reinhard Holzinger, Neuried; Gerhard Weiss, Lalling, both of Fed. Rep. of Germany

[73] Assignee: Krauss Maffei Aktiengesellschaft, Munich, Fed. Rep. of Germany

[21] Appl. No.: 422,394

[22] Filed: Oct. 17, 1989

[30] Foreign Application Priority Data

Oct. 22, 1988 [DE] Fed. Rep. of Germany ....... 3836097

[51] Int. Cl.5 ............................................. B29C 45/80
[52] U.S. Cl. ..................................... 425/150; 264/39; 264/238; 425/190; 425/192 R; 425/451.9; 425/595; 425/DIG. 221
[58] Field of Search ................... 264/39, 238; 425/182, 425/183, 185, 186, 190, 192 R, 450.1, 451.9, 589, 590, 595, DIG. 221, DIG. 223, 150; 29/700

[56] References Cited

U.S. PATENT DOCUMENTS

| | | | |
|---|---|---|---|
| 3,465,387 | 9/1969 | Allard et al. | 425/590 |
| 3,905,741 | 9/1975 | Poncet | 425/590 |
| 3,951,579 | 4/1976 | Myers et al. | 425/190 |
| 4,025,264 | 5/1977 | Hehl | 425/450.1 |
| 4,285,384 | 8/1981 | Wunder | 425/589 |
| 4,473,346 | 9/1984 | Hehl | 425/183 |

FOREIGN PATENT DOCUMENTS 1974739 12/1967 Fed. Rep. of Germany .

OTHER PUBLICATIONS

Kunstoff-Plastics, Feb. 1988.

Primary Examiner—Timothy Heitbrink
Attorney, Agent, or Firm—Herbert Dubno

[57] ABSTRACT

A tie-rod assembly used in a press having an inside fixed mold end plate, an outside fixed end plate spaced from the inside plate, a movable mold plate between the end plates, and an actuator for displacing the movable mold plate toward the inside mold end plate for pressing tools carried by the mold plates together in a closing direction and for moving the tools apart in an opposite opening direction includes a tie rod extending along an axis in the direction through the movable plate and having a threaded inside end and an outside end and a stationary threaded element carried on the inside end plate and axially aligned with the tie rod displaced by the actuator independently of the movable plate between a use position and a changeover position with the threaded end withdrawn in the opening direction and spaced from the inside end plate, a nut actuated by a rotary drive for screwing the nut in the changeover position from the tie-rod on the threaded element and inside and outside bracing devices engageable between the tie rod ends and the respective end plates for pressing the tie rod ends against the end plates in the use position.

11 Claims, 1 Drawing Sheet

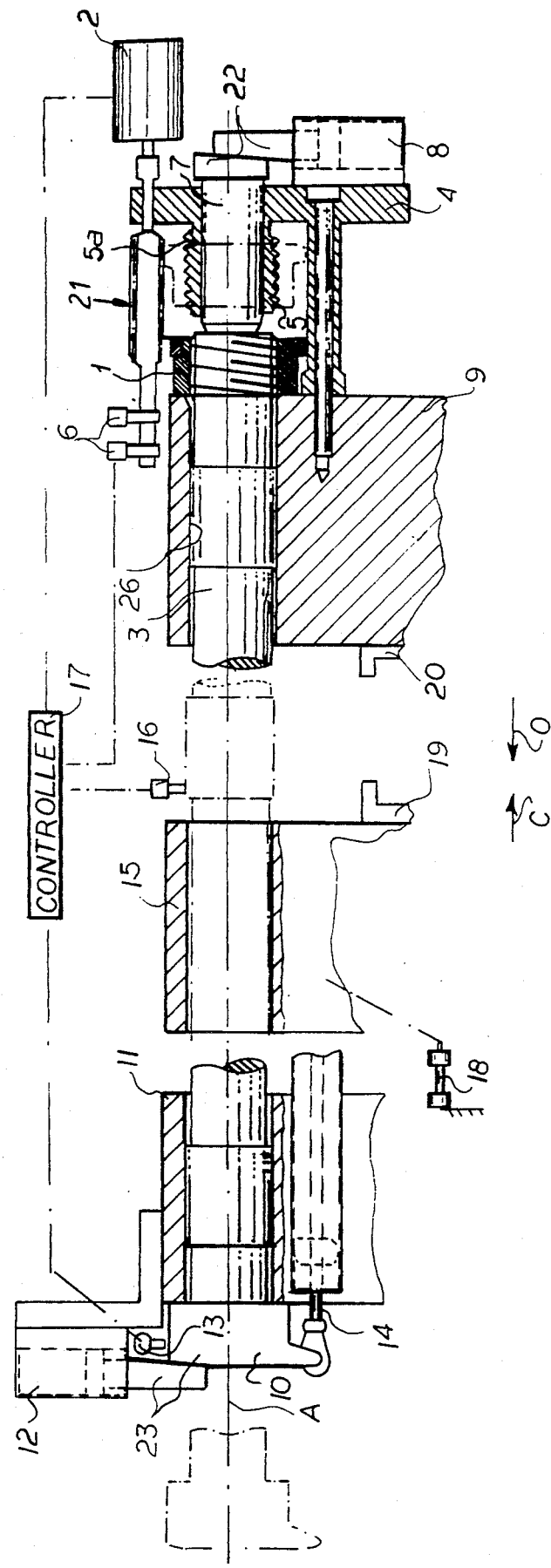

TIE-ROD ASSEMBLY FOR AN INJECTION MOLDING PRESS

FIELD OF THE INVENTION

The present invention relates to a tie-rod assembly. More particularly this invention concerns such an assembly that is used on an injection-molding or other type of press.

BACKGROUND OF THE INVENTION

A standard press, for instance used with an injection-molding machine, comprises outside and inside end plates spanned by a plurality of tie or guide rods and at least one movable plate slidable along the rods between the plates. The movable plate and the inside end plate have confronting faces carrying respective mold parts or halves of similar tools, hence these two plates are also normally called mold plates. A ram is provided to press the movable mold plate with considerable force against the inside fixed mold plate during the molding or working operation. Since this ram is typically braced between the movable mold plate and the outside end plate, the tie rods must be extremely strong and well anchored in the end plates to withstand the resultant tension.

Frequently, however, it is necessary to use tool or mold parts that are so large that they cannot fit through the space between two adjacent rods. Thus at least one of the rods must be removed. Clearly making such a guide/tie rod removable and at the same time anchoring it very solidly is very difficult In one known system of Engel (see Kunstoff-Plastics 2/88) a hydraulic drive unscrews a nut at the inside-plate end of the tie rod and the tie rod is then clamped in the movable plate. The movable plate is then backed away from the inside plate to pull out the tie rod. The tie rod is then unclamped, the movable plate advanced and then reclamped on the tie rod, and so on until the tie rod has been sufficiently retracted. Such a procedure is fairly cumbersome, requiring the massive movable plate to be moved, and also does not provide a high degree of anchoring of the tie rod when the press is in use.

In German patent document 2,455,702 of G. Myers et al (based on U.S. application No. 467,897 filed May 8, 1974) the openable tie rod, of which only one is needed in a normal machine, is unscrewed and stepped out as in the Engel system, but a complicated pincher-type clamp is used.

U.S. Pat. No. 3,673,849 of Voitsekhovsky et al has a system where all the tie rods can be unscrewed from one of the end plates, while U.S. Pat. No. 4,473,346 of Hehl shows an arrangement with a wedge-type clamp for the tie rods.

A complicated unscrewing/clamping system is seen in U.S. Pat. No. 3,465,387 of Martin, and various nut-type tie-rod fasteners and adjusters can be seen in German patent document 2,353,798 of P. Poncet (based on French 7,238,860 filed Oct. 27, 1972) and German Utility Model 1,974,739.

All the known systems are either quite complicated or offer insufficient anchoring for the tie rods. Few allow the tie rod to be uncoupled and withdrawn wholly automatically while still allowing it to be solidly anchored when the press is in use.

OBJECTS OF THE INVENTION

It is therefore an object of the present invention to provide an improved tie-rod assembly.

Another object is the provision of such an improved tie-rod assembly which overcomes the above-given disadvantages, that is which is easy to move out of the way yet solidly anchored when in use.

A further object is to provide an improved method of operating the tie-rod assembly according to this invention.

SUMMARY OF THE INVENTION

The instant invention is a tie-rod assembly used in a press or the like having an inside fixed mold end plate, an outside fixed end plate spaced from the inside plate, a movable mold plate between the end plates, and an actuator for displacing the movable mold plate toward the inside mold end plate for pressing the tools together in a closing direction and for moving the tools apart in an opposite opening direction. These mold plates are adapted to carry respective interfittable tools. The tie-rod assembly according to the invention has a tie rod extending along an axis in the direction through the movable plate and having a threaded inside end and an outside end and a threaded element carried on the inside end plate and axially aligned with the tie rod. The element and inside tie-rod have a substantially identical screwthread so that a nut can be threaded either on the element or on the inside tie-rod end. An actuator can displace the tie rod independently of the movable plate in the directions relative to the end plates between a use position with the inside tie-rod end projecting through the inside end plate and closely juxtaposed with the threaded element and a changeover position with the threaded end withdrawn in the opening direction and spaced from the inside end plate. A rotary drive is engageable with the nut for screwing the nut from a bearing position on the inside tie-rod end and braced in the opening direction against the inside end plate and a position out of engagement with the inside tie-rod end and on the threaded element. An inside bracing device is engageable between the inside tie-rod end and the inside end plate in the bearing position of the nut for pressing the inside tie-rod end and the nut in the opening direction against the inside end plate and an outside bracing device is engageable between the outside tie-rod end and the outside end plate for pressing the outside tie-rod end in the closing direction against the inside end plate.

Thus, with this system for pressing, the nut is screwed onto the inside tie-rod end and engaged in the opening direction against the inside end plate, the inside tie-rod end and nut are braced in the opening direction against the inside end plate, and the outside tie-rod end is braced in the closing direction against the inside end plate. For replacing the mold parts, the inside and outside tie rods ends are unbraced from the respective inside and outside end plates, the nut is unscrewed from the inside tie-rod end and screwed onto the element, and the tie rod is retracted in the opening direction away from and out of the inside end plate.

The tie rod according to this invention can be provided with an abutment on its outside end engageable in the closing direction with the outside end plate. In addition the inside end plate has an inside face turned away in the closing direction from the movable plate and the nut is engageable in the opening direction with this inside face. The threaded element is a sleeve that is coaxial with and of the same outside diameter as the tie rod and the screwing means includes a rotary motor.

In accordance with a further feature of this invention the inside bracing means includes a guide on the inside plate axially aligned with the tie rod, a pin axially displaceable in the guide and having an outside end engageable with the inside end of the tie rod and an opposite outside end, and a fluid-actuated cylinder operatively engageable with the outside end of the pin to press the inside end of the pin against the tie rod.

The element and guide are formed by an externally threaded sleeve that is coaxial with and of the same outside diameter as the tie rod. The cylinder is expandable transverse to the axis and the inside bracing means includes interengageable wedges on the outside pin end and cylinder. Similarly the outside bracing means includes a fluid-actuated cylinder operatively engageable between the outside fixed plate and the outside tie-rod end. This cylinder is expandable transverse to the axis and the outside bracing means also includes interengageable wedges on the outside tie-rod end and cylinder.

The actuator in accordance with the invention is a fluid-actuated cylinder extending parallel to the axis and braced between the outside fixed plate and the outside tie-rod end.

BRIEF DESCRIPTION OF THE DRAWING

The above and other objects, features, and advantages will become more readily apparent from the following, reference being made to the accompanying drawing whose sole figure is a partly diagrammatic axial section through a tie-rod assembly according to this invention.

SPECIFIC DESCRIPTION

As seen in the drawing a press has an inside fixed end plate 9 and an outside fixed end plate 11 spaced horizontally therefrom. A movable plate 15 can be displaced by a heavy-duty actuator 18 in a closing direction C toward the end plate 9 and in an opposite opening direction O away therefrom. The confronting faces of the plates 9 and 15 carry outside and inside mold halves 19 or 20, although according to this invention virtually any type of molding, stamping, or similar tool could be used.

As is known per se the plate 15 rides on a plurality of tie rods whose ends are fixed in the plates 9 and 11. One tie rod 3 at least as shown in the drawing is made to be removable or at least partially movable out of the way along a guide 26 formed in the end plates so that the tools or mold halves 19 and 20 can be switched. The tie rod 3 carries on its outside end a head or abutment 10 that can engage in the closing direction C against the outside face of the fixed plate 11. A long-stroke hydraulic cylinder 14 is braced between a fixed location, for instance the outside plate 11, and the abutment 10 on the outside tie-rod end.

The inside tie-rod end is threaded and can carry a nut 1 that can act as an abutment to similarly engage in the opening direction O against the inside face of the fixed plate 9. The plate 9 carries a support 4 formed with a sleeve 5 formed with an external screwthread 5a that is of the same outside diameter as the inside tie-rod end and that is identically threaded. A rotary drive 2 is coupled via a pinion gear arrangement 21 with the nut 1 so that this nut 1 can be screwed back off the inside tie-rod end and onto the sleeve 5 or vice versa.

A pin 7 guided along the rod axis A inside the sleeve 5 has an inside end that can butt against the inside tie-rod end and an outside end formed as part of a dual wedge arrangement 22 operated by a hydraulic cylinder 8 that is carried on this support 4 and that is expansible perpendicular to the axis A so that the pin slides axially with the tie-rod along guide 26.

Another such cylinder 12 carries a wedge 23 engageable with another such wedge 23 on the abutment 10 to brace the abutment 10 against the outside ace of the fixed plate 11. Respective abutments, cylinders and wedges form inner and outer bracing means.

A controller 17 is connected to the cylinders 8, 12, and 14, to the rotary drive 2, and to various limit switches 6, 13, and 16 provided at the ends and middle of the tie rod 3 to control the various operations.

Thus when the press is in use the rod 3 is in the solid-line position. The abutment 10 is bearing in the direction C against the outside face of the plate 11 and the wedges 23 are engaged together to reinforce this bearing. The nut 1 is threaded on the inside tie-rod end and bears in the direction O against the inside face of the plate 9 and the pin 7 is pressed by the wedges 22 against the inside tie-rod end. In this position the tie rod is extremely solidly held so that the actuator 18 can press the mold halves 19 and 20 together with considerable force.

To change tools the controller 17 relaxes and retracts both hydraulic cylinders 8 and 14 to move the wedges 22 out of engagement and to move the wedge 23 completely out of axial alignment with the abutment 10. Then the motor 2 screws the nut 1 back off the inside tie-rod end onto the sleeve 5. Then the cylinder 14 expands to pull the tie rod 3 completely out of the plate 9 as shown in dot-dash lines.

To reinsert the tie rod 3 the operation of the cylinder 14 is reversed, the motor 2 screws the nut 1 back on the inside tie-rod end, and the cylinders 8 and 12 are pressurized to brace the respective tie-rod ends against the respective and plates 9 and 11.

We claim:

1. An apparatus for changing tools of a press, said apparatus comprising:
   an inside fixed mold end plate;
   an outside fixed end plate spaced axially from the inside plate;
   a movable mold plate between the end plates, the movable mold plate and one of the end plates being adapted to carry respective interfittable tools;
   means for displacing the movable mold plate toward the inside mold plate for pressing the tools together in a closing direction and for moving the tools apart in an opposite opening direction; and
   a tie-rod assembly comprising:
      a tie rod extending axially through the movable plate and having a threaded inside end mounted movably on the inside end plate and an outside end mounted on the outside end plate,
      a threaded element carried on the inside end plate and axially aligned with the tie rod, the element and inside tie rod end having a substantially identical screwthread;
      a nut engageable on the element and on the inside tie rod end,
      an actuator for displacing the tie rod axially and independently of the movable plate relative to the end plates between a use position with the inside tie rod end projecting through the inside end plate and closely juxtaposed with the threaded element and a changeover position with the threaded end withdrawn in the opening direction and spaced from the inside end plate, means engageable with the nut for screwing the nut from a bearing position on the inside tie-rod end and braced in the opening direction against the inside end plate and a position out of engagement with the inside tie rod end and on the threaded element, inside bracing means engageable between the inside tie rod end and the inside end plate in the bearing position of the nut for pressing the inside tie rod end and the nut in the opening direction against the inside end plate, and outside bracing means engageable between the outside tie rod end and the outside end plate for pressing the outside tie rod end in the closing direction against the inside end plate.

2. The apparatus defined in claim 1, further comprising an abutment on the tie rod outside end engageable in the closing direction with the outside end plate.

3. The apparatus defined in claim 1 wherein the inside end plate has an inside face turned away in the closing direction from the movable plate, the nut being engageable in the opening direction with the inside face.

4. The apparatus defined in claim 1 wherein the element is a sleeve that is coaxial with and of the same outside diameter of the tie rod.

5. The apparatus defined in claim 1 wherein the screwing means includes a rotary motor.

6. The apparatus defined in claim 1 wherein the inside bracing means includes a guide on the inside plate axially aligned with the tie rod, a pin axially displaceable in the guide and formed with an outside end thereof engageable with the inside end of the tie rod and an opposite outside end, and a fluid-actuated cylinder operatively engageable with the outside end of the pin to press the inside end of the pin against the tie rod.

7. The apparatus defined in claim 6 wherein the element and guide are formed by an externally threaded sleeve coaxial with the tie rod, the tie rod and the externally threaded sleeve being provided with an identical outside diameter.

8. The apparatus defined in claim 6 wherein the cylinder is expandable transverse to the tie rod and the inside bracing means includes interengageable wedges on the outside pin end and on the cylinder.

9. The apparatus defined in claim 1 wherein the outside bracing means includes a fluid-actuated cylinder operatively engageable between the outside fixed plate and the outside tie rod end.

10. The apparatus defined in claim 9 wherein the cylinder is expandable transverse to the tie rod and the outside bracing means includes interengageable wedges on the outside tie rod end and on the cylinder.

11. The apparatus defined in claim 1 wherein the actuator is a fluid-actuated cylinder extending parallel to the tie rod and braced between the outside fixed plate and the outside tie rod end.

* * * * *